(12) United States Patent
Shu et al.

(10) Patent No.: US 9,096,800 B2
(45) Date of Patent: Aug. 4, 2015

(54) SUPERTORREFACTION OF BIOMASS INTO BIOCOAL

(71) Applicants: Frank H. Shu, Solana Beach, CA (US); Michael J. Cai, La Jolla, CA (US); Fen-Tair Luo, Taipei (TW)

(72) Inventors: Frank H. Shu, Solana Beach, CA (US); Michael J. Cai, La Jolla, CA (US); Fen-Tair Luo, Taipei (TW)

(73) Assignees: Academia Sinica, Taipei (TW); Frank H. Shu, Solana Beach, CA (US)

( * ) Notice: Subject to any disclaimer, the term of this patent is extended or adjusted under 35 U.S.C. 154(b) by 0 days.

(21) Appl. No.: 13/751,634

(22) Filed: Jan. 28, 2013

(65) Prior Publication Data

US 2013/0139432 A1 Jun. 6, 2013

Related U.S. Application Data (63) Continuation of application No. PCT/US2011/045902, filed on Jul. 29, 2011.

(60) Provisional application No. 61/368,832, filed on Jul. 29, 2010.

(51) Int. Cl.
  *C10B 35/00* (2006.01)
  *C10L 5/44* (2006.01)
  *C10L 9/08* (2006.01)
  (Continued)

(52) U.S. Cl.
  CPC ............... *C10B 35/00* (2013.01); *C10B 49/14* (2013.01); *C10B 53/02* (2013.01); *C10B 57/14* (2013.01); *C10L 5/44* (2013.01); *C10L 9/083* (2013.01); *Y02E 50/10* (2013.01); *Y02E 50/14* (2013.01); *Y02E 50/15* (2013.01); *Y02E 50/30* (2013.01)

(58) Field of Classification Search
  CPC ...................................................... C10B 35/00
  USPC ............ 44/629, 589; 48/89; 562/513; 34/505
  See application file for complete search history.

(56) References Cited

U.S. PATENT DOCUMENTS 5,542,962 A    8/1996 Ollerenshaw et al.
6,043,392 A *  3/2000 Holtzapple et al. ........... 562/513
(Continued)

FOREIGN PATENT DOCUMENTS

EA    12806 B1    12/2009
RU    2005123189   1/2006

OTHER PUBLICATIONS

Prins, M.J., Ptasinski, K.J., Janssen, F.J.J.G., Mar. 2006, Torrefaction of Wood, Part 2. Analysis of Products, J. Anal. App. Pyrolysis, 77, pp. 35-40.

Bergman, P.C. A., Boersma, A.R., Zwart, R. W. R., Kiel, J.H.A., Jul. 2005, Torrefaction for Biomass Co-Firing in Existing Coal-Fired Power Stations, "Biocoal", ECN-C-05-013, 71 pages.
(Continued)

*Primary Examiner* — Prem C Singh
*Assistant Examiner* — Chantel Graham
(74) *Attorney, Agent, or Firm* — Brinks Gilson & Lione (57) ABSTRACT

A torrefaction system includes at least one pool containing a liquid heat transfer agent and a conveyor system. The heat transfer agent provides thermal contact with biomass fragments to heat the biomass fragments into biocoal. The conveyor system transports the biomass through the at least one pool in a first direction and transporting the biocoal in a second direction opposite to the first direction in the at least one pool. The heat transfer agent may be oil, paraffin, or molten salt. The conveyor system transports a continuous stream of the biomass fragments into the pools. The torrefaction apparatus further includes a gas collecting system that collects and separates condensable volatile organic compounds during the torrefaction process.

17 Claims, 7 Drawing Sheets

(51) Int. Cl.
*C10B 57/14* (2006.01)
*C10B 49/14* (2006.01)
*C10B 53/02* (2006.01)

(56) References Cited

U.S. PATENT DOCUMENTS

| 7,942,942 | B2 | 5/2011 | Paoluccio | |
|---|---|---|---|---|
| 2007/0227069 | A1* | 10/2007 | Norbeck et al. | 48/89 |
| 2007/0266623 | A1* | 11/2007 | Paoluccio | 44/629 |
| 2008/0223269 | A1 | 9/2008 | Paoluccio | |
| 2010/0083530 | A1* | 4/2010 | Weisselberg et al. | 34/505 |
| 2010/0101141 | A1* | 4/2010 | Shulenberger et al. | 44/589 |

OTHER PUBLICATIONS

ABETS/CGPL/IISc, Oct. 2006, Project Completion Report on the Torrefaction of Bamboo, Advanced Bioresidue Energy Technologies Society; Combustion, Gasification, and Propulsion Laboratory, Indian Institute of Science, Bangalore, 28 pages.

Prins, Mark J., "Thermodynamic Analysis of Biomass Gasification and Torrefaction", Technische Universiteit Eindhoven, 2005, Proefschrift.—ISBN 90-386-2886-2; Feb. 16, 2005; 155 pages.

Extended European Search Report issued in corresponding application EP 11 81 3252, dated Feb. 5, 2014, pp. 1-7.

George W. Huber et al., "Synthesis of Transportation Fuels from Biomass: Chemistry, Catalysts, and Engineering", Chem. Rev. 2006, 106, pp. 4022-4098.

* cited by examiner

SUPERTORREFACTION OF BIOMASS INTO BIOCOAL

CROSS-REFERENCE TO RELATED APPLICATIONS

This application is a continuation of PCT/US2011/045902, filed on Jul. 29, 2011, which claims the benefit of U.S. provisional application Ser. No. 61/368,832, filed on Jul. 29, 2010. The contents of these applications are incorporated herein by reference in their entirety.

FIELD

The present disclosure relates to apparatuses and methods for producing a combustible fuel, and more particularly to torrefaction systems and processes for converting biomass into biocoal.

BACKGROUND

Torrefaction is a thermal chemical treatment of biomass at 200° C. to 320° C. under atmospheric conditions and in the absence of oxygen, as opposed to pyrolysis where high heat is applied to the biomass at approximately 900° C. Torrefaction of biomass into a torrefied biomass (also called "biocoal") can occur at a lower temperature if some volatiles are tolerated together with a chemical rearrangement of the C, H, and O atoms in solids. The biocoal generated from torrefaction is usable in existing coal-fired power plants. Various forms of biomass feedstock may be torrefied to form the biocoal. During torrefaction, water vapor is released from biomass, and continuous removal of the water vapor from the biomass helps to drive the desired decomposition of the green biomass.

The conventional torrefaction process has its shortcomings. Quality control is required to ensure a desired grindability of the biocoal as the power plants use pulverized coal with particle size less than 0.2 mm. Moreover, the biocoal should preferably have very low water content although moisture starts typically 50% by mass when the biomass is green. Further, during torrefaction, some of the volatiles generated during the torrefaction process must be driven off without losing too much of the potential fuel content.

All torrefaction processes require significant amounts of energy beyond what is required to convert biomass into biocoal. For example, it takes energy to chip the wood (or bamboo), briquette the corn stover (or switchgrass), heat the biomass to drive out the water from the biomass, transport the biomass to the torrefaction system, and transport the biocoal from the torrefaction system to a destination. Thus, it is important to achieve high energy efficiency at the production facility if the goal is to produce price-competitive biocoal. Since energy losses increase as the surface area increases, but production rate increases as the volume increases, high throughput is the key to achieving energy efficiency and economic competitiveness in the torrefaction process.

To reduce energy consumption, it has been proposed to use volatile organic compounds (VOCs) released from the biomass during torrefaction as a heat source. The VOCs may be sent to a reactor or furnace, which in turn generates flue gas to heat the biomass. This method has technical and economical problems. First, the flue gas is not an efficient heat transfer agent. Second, building a continuous process apparatus is more of a challenge with gas-based systems that must exclude air. With flue-gas batch processing, it takes many hours to get temperatures high enough to drive out water and heat the biomass to torrefaction conditions. Third, if the heat of torrefaction derives from burning a portion of the biomass, considerable smoke and soot is generated that contributes to air pollution. Fourth, when woody materials are used as the biomass, the woody materials do not generate sufficient VOCs during torrefaction. To obtain a higher quality product, the VOCs need to be mixed with natural gas, thereby increasing production costs and the carbon dioxide footprint.

It has also been proposed to use high temperature steam as a clean source to heat the biomass. However, water may permeate the final products, adversely affecting the quality of the biocoal.

U.S. Pat. No. 7,942,942 ("the '942 patent") discloses an apparatus using a serpentine path of piping to torrefy biomass with hot paraffin or oil. In the '942 patent, biomass enters into an oxygen excluded environment via a pre-heating section of warm oil/paraffin, is torrefied in a middle section of hot oil/paraffin, and exits as biocoal via a post-cooling section of warm oil/paraffin. Each section is kept at a fixed temperature by external heating or cooling, resulting in additional energy loss, especially when water in the biomass is evaporated without the latent heat being recaptured in subsequent recondensation. Moreover, oil/paraffin remains trapped in the pores of the biocoal, and the residual oil/paraffin may constitute as much as 40% of the weight of the biocoal, making the biocoal unsuitable for pulverization for use in modern coal-fired power plants. Further, because oil costs more than the coal per unit heating value, the produced biocoal with large amounts of residual oil is not economically viable. A design where hot biocoal exits into a post-cooling oil port maintained at 280° F. (138° C.) and exposed to air also poses a safety issue. Residual VOCs like methanol and methane with low flash points released from the still hot biocoal or that migrate from the middle torrefying section to the end cooling section of a connected serpentine path could catch on fire or even cause an explosion.

SUMMARY

The torrefaction process according to the present disclosure can economically and efficiently convert biomass into biocoal. In one form, the torrefaction system includes at least one pool containing a liquid heat transfer agent. The heat transfer agent provides thermal contact with biomass fragments to heat the biomass fragments into biocoal. A conveyor system is provided to transport the biomass through the at least one pool in a first direction and the biocoal in a second direction opposite to the first direction in the at least one pool.

In another form, a torrefaction process for torrefying a biomass into a biocoal includes: pre-drying the biomass; transporting the biomass through at least one pool containing a liquid heat transfer agent in a first direction, the liquid heat transfer agent providing thermal contact with the biomass to heat the biomass into biocoal; transporting the biocoal through the at least one pool in a second direction opposite to the first direction; and post-drying the biocoal.

In one feature, the torrefaction process includes a step of capturing the condensable volatile organic compounds (VOCs) for more economic use.

In another feature, the torrefaction system includes a plurality of pools having different temperatures, which are maintained passively in thermal equilibrium between the incoming biomass and the outgoing biocoal and VOCs. The heat transfer agent for the torrefaction process is selected from a group consisting of mineral oils, paraffin, and organic molten salts. Preferably, the organic molten salt for all forms of biomass is a eutectic mixture of sodium acetate and potassium acetate. If higher operating temperature is desired for fast torrefaction or flash pyrolysis, mixtures of fluoride or chloride salts of alkali metals may be used.

In other features, the plurality of pools further include solvent pools for washing mineral oil or paraffin off the exiting biocoal. The solvent may be hexane or naptha when the heat transfer agent is oil and paraffin. When the heat transfer agent is organic molten salts, the solvent may be water at temperatures at or below the boiling point of the liquid phase.

In other features, the torrefaction apparatus includes a conveyor system that provides a continuous stream of the biomass fragments into the plurality of pools that contain different liquids. The biomass may be heated to a temperature between about 250° C. and 300° C. for periods between about 10 minutes (at the higher temperature) and about one hour (at the lower temperature).

Further features and advantages will be apparent from the following description and from the claims.

DRAWINGS

The accompanying drawings, incorporated in and forming a part of the specification, illustrate several aspects of the present invention and, together with the description, serve to explain the principles of the invention. The components in the figures are not necessarily to scale. In the drawings.

DETAILED DESCRIPTION

Figure 1:
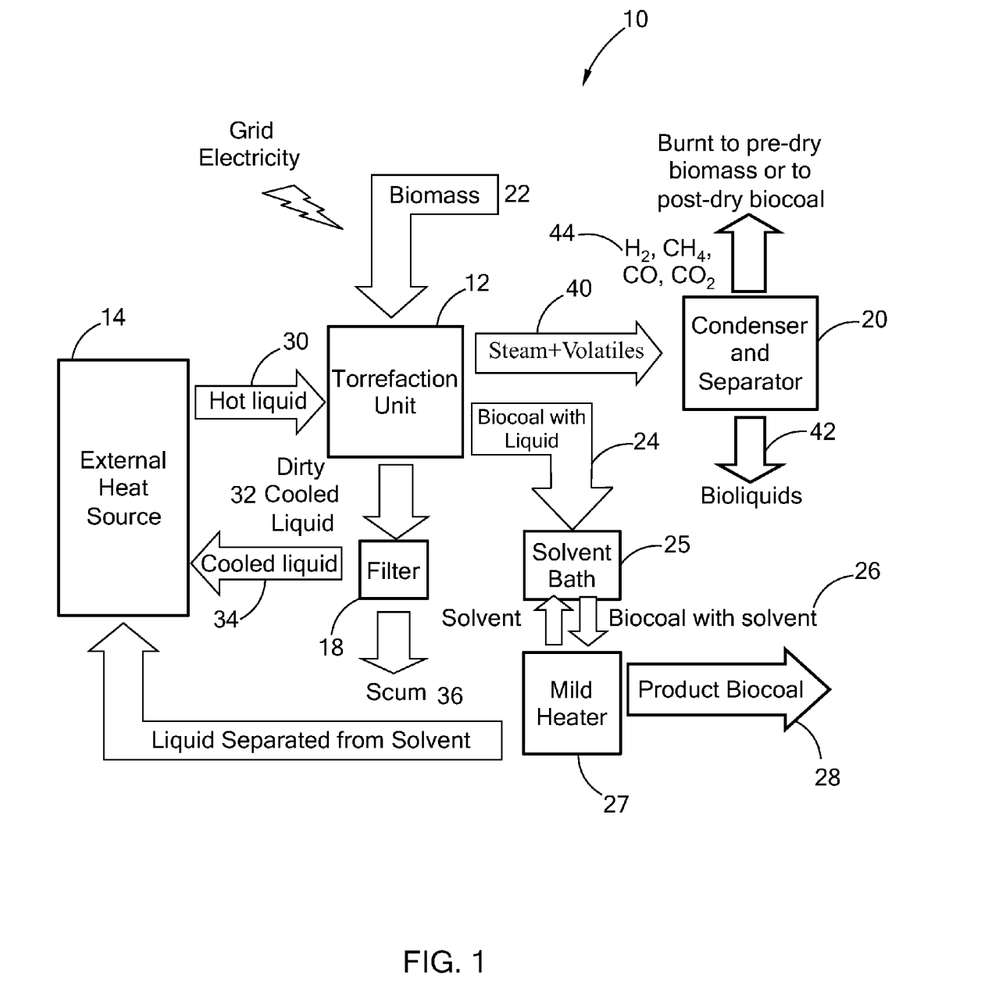
FIG. 1 is a schematic view of a production plant or system that turns biomass into biocoal/volatiles in accordance with the general teachings of the present disclosure.

Referring to FIG. 1, a production plant or system 10 includes a torrefaction unit 12, an external heat source 14, a filter 18, and a condenser and separator unit 20. Biomass 22, made in the form of chips or briquettes with the help of grid electricity, is delivered to the torrefaction unit 12 where the torrefaction process occurs to convert the biomass 22 into biocoal 24. The biomass 22 may include, but is not limited to, sugar-cane bagasse, corn stover, rice straw, wheat straw, bamboo, wood chips, and switchgrass.

An external heat source 14, such as a nuclear reactor with modest thermal output, or a furnace that burns coal, or natural gas, or a portion of the produced biocoal, with or without additional heat exchangers, heats an appropriate liquid 30 to a desired torrefaction temperature. The hot liquid 30 may be oils, paraffin or molten salts, but other forms of liquids may be used without departing from the scope of the present disclosure. The hot liquid 30 is supplied to the torrefaction unit 12 as a heat-transfer agent to heat the biomass 22. Depending on the moisture content of biocoal and care taken not to lose unnecessary heat during torrefaction, the leverage factor is typically between 5 and 20 for converting biomass into biocoal. In other words, input of 1 watt of external thermal power can recover between 5 and 20 watts of heating value in the resulting biocoal.

The filter 18 filters the dirty cooled liquid 32 to separate scum 36 from the cooled liquid 34 (which is typically only a few ° C. below the torrefaction temperature). The clean cooled liquid 34 is circulated back to the external heat source 14. The scum consists of bits and pieces of organic material and plant minerals covered with the heat-exchange liquid. These are skimmed off the top or dredged from the bottom of the various pools in the torrefaction unit 12 by the filter 18. As an example, the filter 18 may be crushed biocoal produced by the torrefaction process. Laboratory experiments demonstrate that dirty oil cleaned by filtering can be made to have no visible solid particulates. The "scum" has energy value and can be compressed and sold with the biocoal. Alternatively, the scum, when covered with oil if oil is used as the heat transfer agent, can be burned to help pre-dry the biomass.

During torrefaction, steam and volatiles are driven out from the biomass 22. The mixture of steam and volatiles 40 is delivered to the condenser and separator unit 20 for further processing. In some embodiments, VOC pipes that traverse the pools of the torrefaction unit 12 may constitute the condenser and separator. In any case, the mixture of steam and volatiles 40 may be condensed in the condenser and separator unit 20 and separated into bioliquids 42 and gases 44 that contain CO, $CO_2$ and perhaps also $H_2$, $CH_4$ and other trace volatiles. These gases 44 may be burnt to help pre-dry the biomass or post-dry the product biocoal 28, or the gases 44 may be used or sold as feedstock for additional chemical synthesis.

Heat-transfer liquid permeates the biocoal 24 that emanates from the torrefaction unit 12. This biocoal permeated with liquid 24 is sent through a solvent bath 25 that extracts the liquid from the biocoal resulting in a biocoal 26 permeated with solvent. The extracted liquid is sent to the external heat source 14 for reheating as the hot torrefaction heat-transfer agent, and the biocoal with solvent 26 is sent through a mild heater 27, which evaporates the solvent, resulting in a product biocoal 28 that is largely free of either heat-transfer liquid or solvent. In some embodiments, the solvent bath 25 and the mild heater 27 may be one or more of the pools of the torrefaction unit 12. The solvent vapor is recondensed as a liquid when it is sent back to the solvent bath 25. The product biocoal 28 is transported to an end user such as a coal-fired plant that burns pulverized coal.

The torrefaction unit 12 of the present disclosure thus uses liquid heat transfer agents to transform biomass of any moisture content into biocoal on an industrial scale, as will be described in more detail below.

First Embodiment

Figure 2:
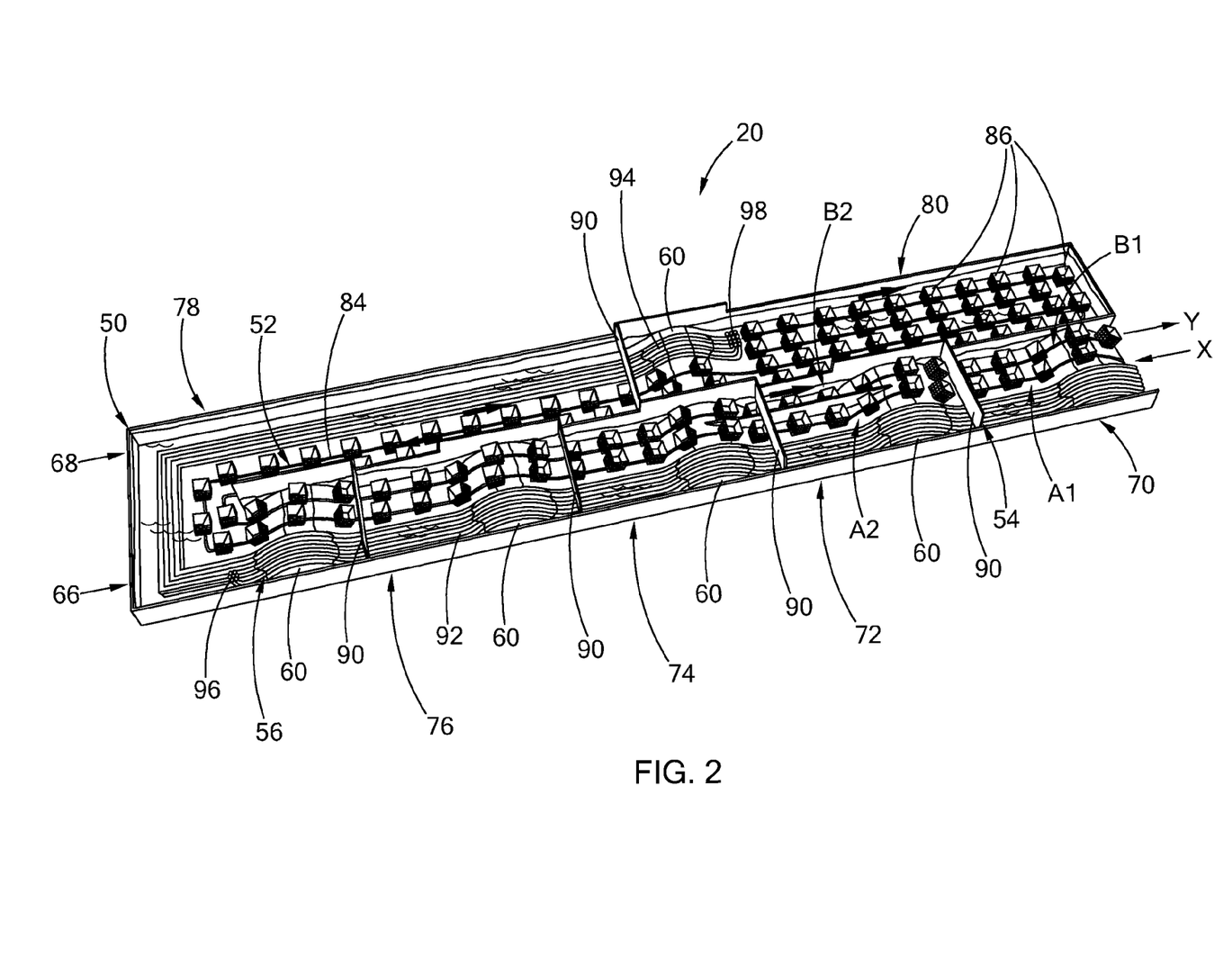
FIG. 2 is a schematic view of a torrefaction unit of the production plant of FIG. 1 according to a first embodiment of the present disclosure, wherein the ceiling is removed for viewing the interior of the torrefaction unit.

Referring to FIG. 2, a torrefaction unit 12 according to a first embodiment of the present disclosure includes a housing 50, a conveyor system 52, an airlock system 54, and a gas collecting system 56. The ceiling of the housing 50 is removed to show the interior of the torrefaction unit 12.

The housing 50, in a substantially rectangular shape to facilitate construction, includes a plurality of bridges 60 raised from a bottom wall of the housing 50 to divide the housing 50 into a plurality of bodies of liquids. The liquids are heat-transfer agent, solvent, or water for heating and cleaning the biomass 22 and biocoal 24. In the present embodiment, six bodies of liquids are provided, including two water pools 70 and 72 containing water, two solvent pools 74 and 76 containing solvent, and two torrefying rivers 78 and 80 containing flowing liquid heat-transfer agents. The pools can be stagnant for most purposes but can be slowly flowing if this proves more convenient for continuous maintenance.

The heat transfer agents for the torrefaction process include, but are not limited to, mineral oils, paraffin, and organic molten salts. The organic molten salt for all forms of biomass is preferably a eutectic mixture of sodium acetate and potassium acetate. If higher operating temperature is desired for fast torrefaction or flash pyrolysis, mixtures of fluoride or chloride salts of alkali metals may be used. The pools 74 and 76 contain solvent for washing off the liquid heat transfer agent attached to the biocoal. When mineral oil or paraffin serves as the heat transfer agent, hexane or naptha may be used as the solvent in the solvent pools 74 and 76. When organic salt serves as the heat transfer agent, water may be used as the solvent in the solvent pools 74 and 76 in addition to the water pools 70 and 72.

The water pools 70, 72 and solvent pools 74, and 76 are arranged at a front side 66 of the housing 50 and aligned along a longitudinal direction of the housing 50. The torrefying rivers (or pools) 78 and 80 are arranged at a rear side 68 of the housing 50 and aligned along a longitudinal direction of the housing 50. The torrefaction unit 12 may include any number (including one) and types of pools without departing from the scope of the present disclosure.

In the present embodiment, the torrefying pools 78 and 80 contain mineral oil or paraffin as the heat transfer agent and the solvent pools 74 and 76 contain hexane or naptha. Hexane is widely used in industrial applications to dissolve oil. Naptha is an alternative. The water pools 70 and 72 contain water. In a torrefaction unit using oil as a heat transfer agent, the water pool 72 can be heated to a high enough temperature to evaporate the hexane or naptha from the biocoal. In a torrefaction unit using molten salt as a heat transfer agent, the water in pools 70 and 72 are an excellent solvent to remove the salt from the exiting biocoal. The liquid types as discussed above are exemplary only and other types of liquids may be used without departing from the scope of the present disclosure. The number and size of solvent pools should be sufficient to wash the biocoal of residual oil or salt to levels acceptable to the end user. For worker health and safety, the pool 70, which is the first pool for biomass and the last pool for biocoal can be water in all cases. While not shown, it is understood that instead of water washing, mechanical crushing and pressing or centrifugation can be used to remove residual heat transfer agent and solvents from the exiting biocoal. These measures would keep the biocoal drier.

The liquids contained in the pools 70, 72, 74, 76, 78 and 80 have a temperature of $T_1$, $T_2$, $T_3$, $T_4$, $T_5$, and $T_6$, respectively, where $T_1<T_2<T_3<T_4<T_5<T_6$. $T_1$, $T_2$, $T_3$, $T_4$, $T_5$ and $T_6$ are in the desired temperature range between 120° C. and 300° C. with $T_5$ and $T_6$ being actively controlled at 230° C. and 300° C., respectively, for two stages of the actual torrefaction process. The temperatures $T_1$, $T_2$, $T_3$, and $T_4$ are obtained passively by equilibrium of the counter-streams of cold biomass and hot biocoal in baskets and hot VOCs in thermally conductive pipes. The biomass is continually submerged and raised while heated in a stepwise fashion by the liquids contained in the pools 70, 72, 74, 76, 78, and 80, with air being excluded from the spaces above the liquids.

The conveyor system 52 includes a rail or conveyor belt 84 for continuously transporting a plurality of caged baskets 86 that carry biomass/biocoal. The caged baskets 86 travel along the conveyor belt 84 and bring biomass chips or briquettes to be deep "fried" in the liquid heat transfer agent in the torrefying rivers 78 and 80. Rails or wheels (not shown) may be employed to aid towing of the conveyor belt 84. The conveyor belt 84 moves the plurality of caged baskets 86 along a continuous moving path in the torrefaction unit 12 such that the caged baskets 86 are arranged in at least two rows in each of the pools. As the caged baskets 86 are transported into the torrefaction unit 12 in a first direction as indicated by arrow X, the biomass is heated by the liquids in the bodies 70, 72, 74, 78 and 80 in a stepwise fashion and finally torrefieid in the first and second torrefying rivers 78 and 80. In the illustrative example, two rows of baskets are moved in opposite directions in all pools except the second torrefying river 80. Active heating of the torrefying rivers 78 and 80 occurs, either directly from below, or more safely from an external source that heats the liquid heat-transfer agent between extraction from the torrefying rivers 78 and 80 and pumping back into the torrefying rivers 78 and 80.

After passing the second torrefying pool 80, the biomass is completely torrefied and the torrified biomass (i.e., the biocoal) is transported through these pools in a reverse order along a second direction opposite to the first direction and leaves the torrefaction unit 12 at the water pool 70, as indicated by arrow Y. The biomass and the torrefied biomass travel through the torrefaction unit 12 along a continuous path in at least two rows in each of the bodies of liquid. Additional passes can be added in the main torrefying river 80 to increase the overall throughput for making biocoal for the same train of biomass that passes through pools 70, 72, 74, 76, and river 78; however, the train must move faster in order that each basket goes through the river 80 within a predetermined period of time, for example, ten minutes. A corresponding greater rate of adding heat to the rivers 78 and 80 must also occur to maintain their temperatures at 230° C. and 300° C., respectively. By expanding the volume of the torrefying river 80 without necessarily expanding the size of the pools, a relatively more compact configuration, and therefore, higher thermal efficiency, can be achieved at the higher throughput of the biocoal.

Figure 3:
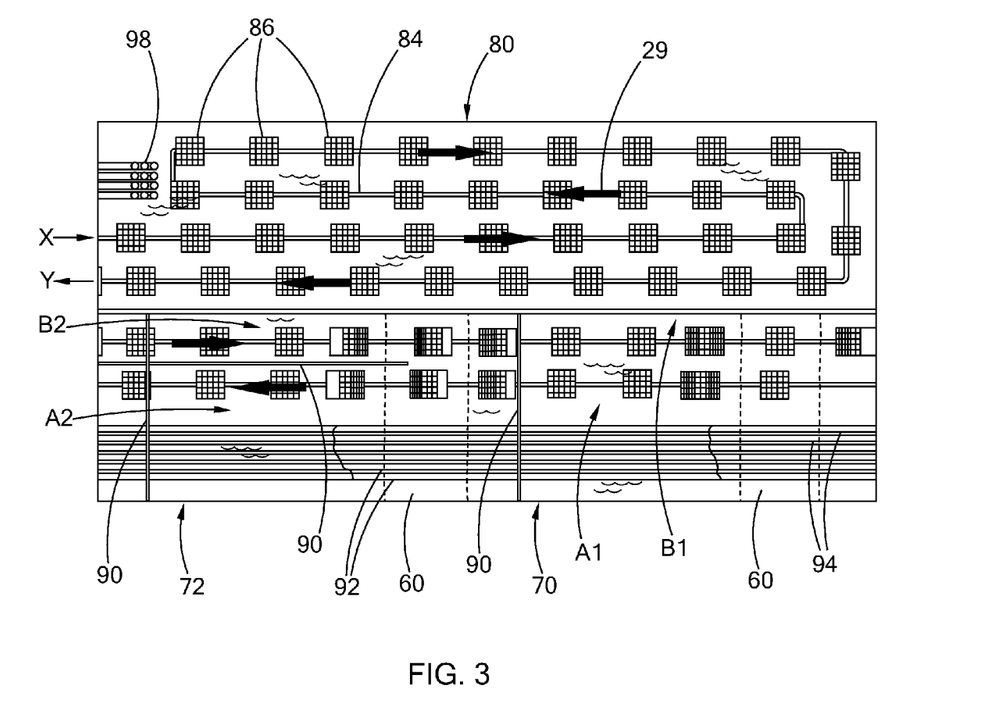
FIG. 3 is an enlarged view of right end portion of FIG. 2, illustrating the moving path of caged baskets.

As shown in FIG. 3, a number of caged baskets 86 containing biomass chips or briquettes are submerged in the torrefying river 80 which has the highest temperature among all bodies of liquid. Arrow X indicates the direction of the entering biomass, whereas arrow Y indicates the direction of exiting biocoal. Arrows 29 indicate the moving path of the caged baskets 86. In the present embodiment, it takes about ten minutes for one caged basket 86 from entering to leaving the torrefying river 80. Similarly, the time spent in the other bodies, such as the torrefying river 78, the water pools 70, 72 and solvent pools 74 and 76 is proportional to the length of the bodies of liquid. It is understood that the time spent in the torrefying river 80 (and other pools) may vary depending on the operating temperature (particularly, temperature of the heat transfer agent), the size of the torrefying river 80, and the travel speed of the biomass/biocoal. The biomass may be heated to a temperature between about 250° C. and 300° C. for periods between about 10 minutes (at the higher temperature) and about one hour (at the lower temperature).

The first torrefying river 78, which has the second highest temperature among the bodies of liquid, extends from the front side 66 to the rear side 68 of the housing 50. The first and second torrefying rivers 78 and 80 may be provided with pipes (not shown) to add and remove the liquid heat transfer agent in them. The warm and hot liquid heat transfer agents in rivers 78 and 80 exclude air and provide efficient thermal contact with irregularly-shaped biomass pieces received in the caged baskets 86. When the biomass is delivered into the torrefaction unit 12 and is immersed in the pools 70, 72, 74, 76, 78 and 80, water and volatiles are driven out of the biomass, and the baskets 86 of biomass (if entering) become baskets 86 of bio-coal (if leaving) within minutes.

Referring back to FIG. 2, the airlock system 54 includes a plurality of dividers 90 provided at the front side 66 of the housing 50 and encompasses the water pools 70, 72, and the solvent pools 74 and 76 for preventing air from entering the space above the liquid level. The dividers 90 are placed in the pools 70, 72, 74, 76, and river 78 to separate these bodies from the outside world to prevent air from entering the spaces above the liquids. Only volatile gases and steam released from the biomass are present in the space above the torrefying rivers 78 and 80. The volatile gases flow out of the torrefaction unit 20 under their own pressure through the gas collecting system 56. The airlock system 54, multiply redundant for extra safety, provides an oxygen-free environment in a relatively cold state for those parts in close proximity with the outside.

Figure 4:
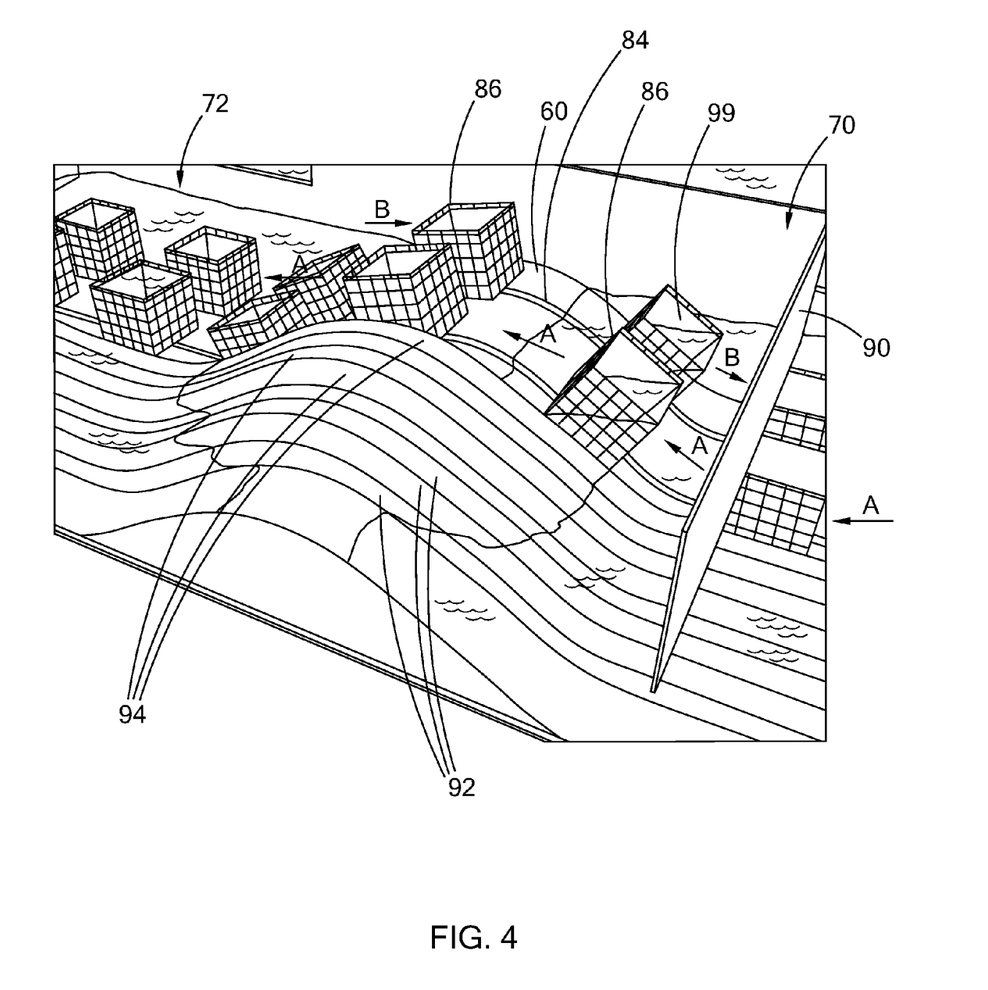
FIG. 4 is an enlarged view of the liquid pools of FIG. 2.

FIG. 4 is an enlarged view of the water pools 70 and 72 showing how the caged baskets 86 travels along the various pools 70, 72, 74, 76, 78 and 80. Two rows of caged baskets 86 move in opposite directions. The baskets 86 in the front row carry the biomass chips or pellets from outside as indicated by arrows A, whereas the caged baskets 86 in the back row carry torrefied biocoal to outside as indicated by arrows B.

After passing under the divider 90, the baskets 86 in the front row, move to the left as indicated by arrow A, and ride on the conveyer belt 84 over bridges 60 from the water pool 70 to the water pool 72. While not shown in FIG. 4, it is understood that the caged basket 86 continue to travel along the solvent pools 74, 76 and the torrefying rivers 78 and 80 in a similar fashion. The caged baskets 86 with torrefieid biomass (i.e., biocoal), as indicated by arrow B, move to the right, emerges from the water pool 70, dive into the water pool 70, cross under the divider 90, emerge beyond the water pool 70 and exit the torrefaction unit 12. Before entering the water pool 72, the caged baskets 86 that carry the biocoal travel through the cross-flowing torrefying rivers 80, 78 and the solvent pools 76 and 74 in a similar fashion. The biocoal contained in the baskets 86 is cooled in the water pool 70 to near-ambient temperatures until it can safely be transported outside the torrefaction unit 12 to an end user.

As shown in FIG. 4, the caged baskets 86 each include a liner 99 along the walls of the caged baskets 86. The liner 99 is porous to the heat transfer agent, solvent or water contained in the pools 70, 72, 74, 76, 78 and 80 but not to biomass chips/pellets or torrefied biocoal. As such, the liner 99 prevents the biomass chips/pellets or torrefied biocoal contained in the caged baskets 86 from falling outside the baskets 86 while allowing the heat transfer agent, solvent, or water to flow through the liner 99 to heat or clean the biomass/biocoal.

Referring back to FIG. 2, the gas collecting system 56 includes a plurality of first pipes 92 and a plurality of second pipes 94 for collecting volatile organic compounds (VOCs) released from the biomass 22 when the caged baskets 86 travel along the torrefying pools 78 and 80. The plurality of first pipes 92 each include an inlet 96 disposed in the first torrefying pool 78 and above the liquid level for collecting vented vapor above the first torrefying pool 78. The plurality of second pipes 94 each include an inlet 98 disposed in the second torrefying pool 80 and above the liquid level for collecting vented vapor above the second torrefying pool 80. Depending on the temperatures of the solvent pools and the water pools, additional pipes (not shown) may or may not be needed to collect the vapors released in water pool 70, 72 and the solvent pools 74 and 76.

One divider 90 is disposed adjacent to the bridge 60 that separates the first torrefying pool 78 from the second torrefying pool 80 to prevent the VOCs present in the space above the first torrefying pool 78 from mixing with the VOCs present in the space above the second torrefying pool 80 for better collection of different types of the VOCs. With two torrefying pools 78 and 80, release and later condensation and separation of VOCs can be better controlled.

Apart from water, the condensable VOCs may be categorized into three general classes: (a) alcohols (principally methanol), (b) organic acids (mostly acetic, but some formic and lactic also), and (c) other aromatic and aliphatic compounds (furfural, hydroxyacetone, etc.). The substances in categories (a) and (c) have value as fuel additives, while those in category (b) are important industrial and agricultural chemicals. The VOCs and steam collected by the first and second pipes 92 and 94 are sent to the condenser and separator unit 20 (FIG. 1) for further processing, if needed. The condenser and separator unit 20 separates the mixture of condensable and non-condensable VOCs into different bioliquids based on different condensation temperatures and gases such as $H_2$, $CH_4$, CO, and $CO_2$. The gases can be burned for fuel or collected for further chemical processing. The liquids can undergo further separation and processing as marketable products.

In the present embodiment, VOCs are recovered, condensed and sold separately, rather than burned as an additional heat source for the conventional torrefaction process, since VOCs have more economical value per unit weight than the biocoal. In the present embodiment, a portion of the biocoal produced by the torrefaction unit can be burned to provide a relatively cheaper heat source for the torrefaction process.

When the biomass travels from the water pools 70, 72, through the solvent pools 74, 76, to the torrefying rivers 78 and 80 in the first direction X, the biomass absorbs heat from the liquids contained in these pools. When the torrefied biomass (i.e., biocoal) travels through these bodies in a reverse order in the second direction Y, the torrefied biomass releases heat to the liquids contained in these bodies. Therefore, the biocoal is cooled by the same pools that heat the biomass. Absorption of heat by the entering biomass and release of heat by the exiting biocoal lead to equilibration temperatures between ambient temperature and the torrefaction temperatures. When the torrefied biomass exits the torrefaction unit 12 and is in contact with air, the torrefied biomass is sufficiently cooled to avoid auto-ignition. The passage of the VOCs through the pools in the plurality of first and second pipes 92 and 94 also helps cool these vapors and aids in the condensation and separation of the desired liquids. No external energy source is required to cool the biocoal, resulting in energy saving.

In an oxygen-free environment, the liquids contained in these pools 70, 72, 74, 76, 78, and 80 are stable under the torrefaction temperature in the range between about 250 to 300° C. and can be cleanly burned at a coal-fired power plant. Suitable liquid heat transfer mediums for the torrefaction process of the present disclose include, but are not limited to, oils derived from high temperature distillation of petroleum, certain synthetic heat transfer fluids, or heated paraffin, or metalloorganic salts. The biocoal obtained from the present torrefaction process can be later pulverized for use as a sustainable and carbon-neutral fuel in coal-fired power plants.

Second Embodiment

Figure 5:
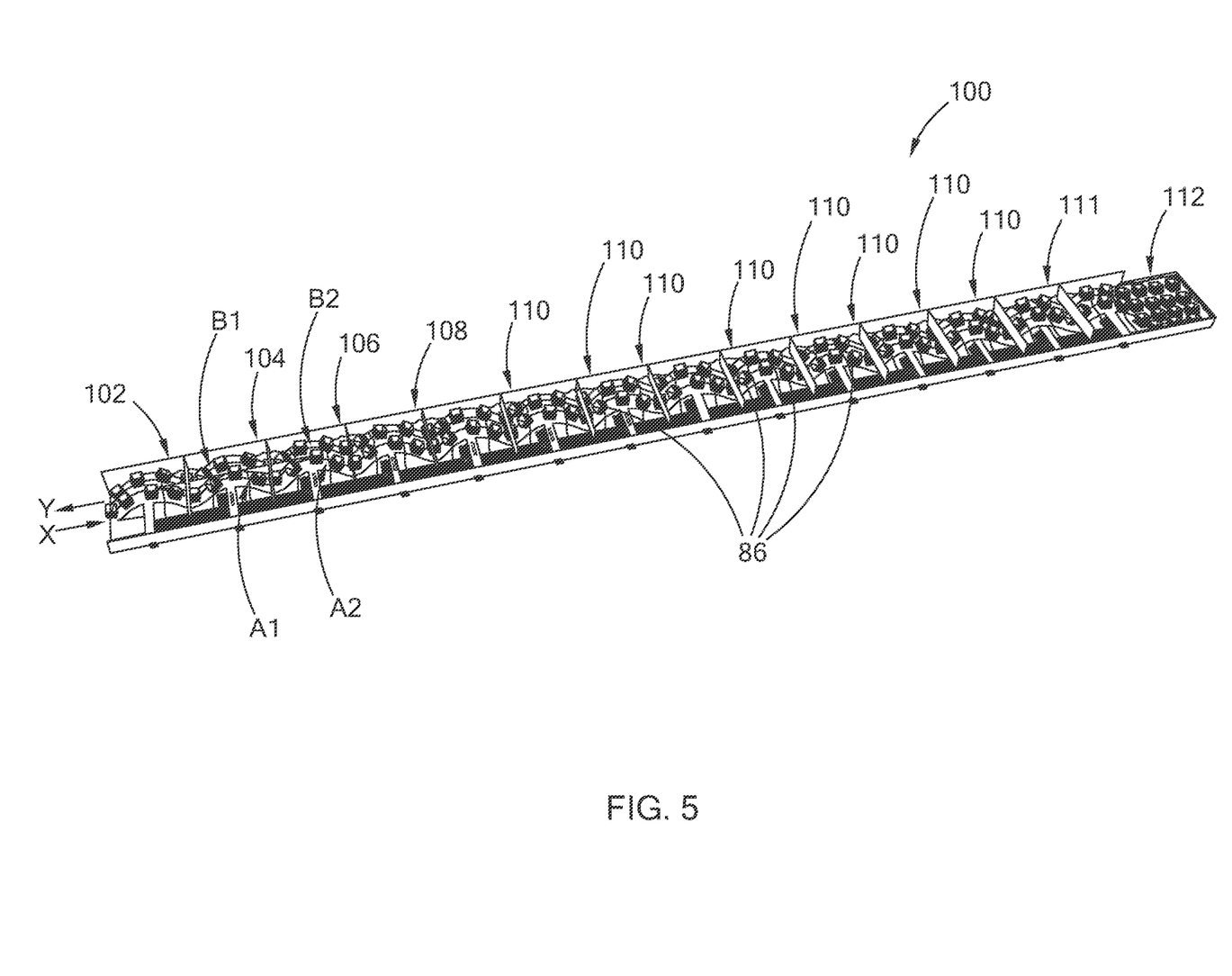
FIG. 5 is a schematic view of a torrefaction unit, with the ceiling removed, according to a second embodiment of the present disclosure that specializes to the use of hot and warm oil as the heat-transfer medium, hexane (or naptha) as a solvent to wash off the oil, and hot water to boil off the hexane or naptha.

Referring to FIG. 5, a torrefaction unit 100 according to a second embodiment of the present disclosure is similar to that of FIG. 3 except for specialization to an oil system and a more detailed description of the number and function of the pools and the mechanism of the condensation pipes. The torrefaction unit 100 includes two water pools 102, 104, two solvent pools 106, 108 (containing hexane or naptha) and eight oil pools 110, a first torrefying river 111 containing warm oil or molten paraffin, and a second torrefying river 112 containing hot oil or molten paraffin. The torrefying rivers 111, 112 may contain oil or molten paraffin at 230° C. and 300° C., respectively. The two solvent pools 106, 108 and eight oil pools 110 have a temperature of $T_1$, $T_2$, . . . and $T_{10}$, respectively. The water pool 102 is divided into water reservoirs A1 and B1, whereas the water pool 104 is divided into water reservoirs A2 and B2 (also shown in FIGS. 2 and 3). The construction of the torrefaction unit 100 is similar to the torrefaction unit 12 of the first embodiment and the detailed description thereof is omitted herein for clarity.

The entering biomass and exiting biocoal and VOC vapor plus steam inside highly conducting pipes pass through the ten solvent and oil pools 106, 108 and 110 and two water reservoirs A1 and A2 (also shown in FIG. 3). If biomass plunge at 25° C. into the first, second, . . . , tenth pools at temperatures $T_1$, $T_2$, . . . , and $T_{10}$, with biocoal and VOC vapor and steam exiting the warm river (i.e., torrefying river 111, denoted by subscript wr) at temperature 230° C. and exiting the two water reservoirs B2 and B1 (also shown in FIG. 3) at temperature 25° C., the balance of heating by the exiting biocoal plus vapor and cooling by the entering biomass gives the equilibrium equations, in the approximation of small temperature differences of the entering and exiting materials in each bath:

$$(T_1 - 25° C.) = \alpha_{12}(T_2 - T_1),$$

$$(T_2 - T_1) = \alpha_{23}(T_3 - T_2),$$

. . .

$$(T_9 - T_8) = \alpha_{9,10}(T_{10} - T_9)$$

$$(T_{10} - T_9) = \alpha_{10,wr}(230° C. - T_{10}),$$

where $\alpha_{ij}$ is the ratio, $$\alpha_{ij} = \frac{\dot{M}_c(\partial h_c/\partial T)_P + \dot{M}_v(\partial h_v/\partial T)_P}{\dot{M}_b(\partial h_b/\partial T)_P},$$

with $h_b$, $h_c$, or $h_v$, and $\dot{M}_b$, $\dot{M}_c$, or $\dot{M}_v$ being the specific enthalpies of the biomass, biocoal, or vapor (VOC plus steam), and the mass-rates of processing biomass, generating biocoal or vapor, respectively.

Mass balance requires $\dot{M}_c + \dot{M}_v = \dot{M}_b$ in steady state. The above form holds strictly only if phase changes are ignored, but the formalism can be modified to include latent heats of condensation. The set of simultaneous equations is equivalent to the tri-diagonal matrix equation with $1 + \alpha_{ij}$ on the diagonal and $-1$ and $\alpha_{ij}$ on the off-diagonals:

$$\begin{pmatrix} 1+\alpha_{12} & -\alpha_{12} & 0 & \ldots \\ -1 & 1+\alpha_{23} & -\alpha_{23} & \ldots \\ 0 & \ldots & \ldots & \ldots \\ 0 & \ldots & -1 & 1+\alpha_{10,wr} \end{pmatrix} \begin{pmatrix} T_1 \\ T_2 \\ \ldots \\ T_{10} \end{pmatrix} = \begin{pmatrix} 25° C. \\ 0 \\ \ldots \\ \alpha_{10,wr} 230° C. \end{pmatrix}.$$

The governing matrix equation can be easily solved numerically once the values of $\alpha_{ij}$ are obtained from experiments with the relevant biomass source. As a pedagogic example, consider the solution of this matrix equation when $\alpha_{ij}$ has a universal value $\alpha$. The solution then reads $$T_n = \frac{\Theta_n}{\Delta_{10}}, n = 1, 2, \ldots, 10,$$

where $\Delta_8$ is the determinant of the 10×10 coefficient matrix, $$\Delta_{10} 1 + \alpha + \alpha^2 + \alpha^3 + \alpha^4 + \alpha^5 + \alpha^6 + \alpha^7 + \alpha^8 + \alpha^9 + \alpha^{10}.$$

and $\Theta_n$ is the determinant formed by replacing the n-th column of the coefficient matrix by the column vector on the right-hand side:

$$\Theta_1 = \Delta_9(25\ C) + \alpha^{10}(230\ C),$$

$$\Theta_2 = \Delta_8(25\ C) + \alpha^9 \Delta_1(230\ C),$$

$$\Theta_3 = \Delta_7(25\ C) + \alpha^8 \Delta_2(230\ C),$$

$$\Theta_4 = \Delta_6(25\ C) + \alpha^7 \Delta_3(230\ C),$$

$$\Theta_5 = \Delta_5(25\ C) + \alpha^6 \Delta_4(230\ C),$$

$$\Theta_6 = \Delta_4(25\ C) + \alpha^5 \Delta_5(230\ C),$$

$$\Theta_7 = \Delta_3(25\ C) + \alpha^4 \Delta_6(230\ C),$$

$$\Theta_8 = \Delta_2(25\ C) + \alpha^3 \Delta_7(230\ C),$$

$$\Theta_9 = \Delta_1(25\ C) + \alpha^2 \Delta_8(230\ C),$$

$$\Theta_{10} = 25\ C + \alpha \Delta_9(230\ C).$$

where $\Delta_1, \Delta_2, \ldots \Delta_9$ are the determinants of the 1×1, 2×2, . . . 9×9 coefficient matrices:

$$\Delta_1 = 1+\alpha, \Delta_2 = 1+\alpha+\alpha^2, \ldots, \Delta_9 = 1+\alpha+\alpha^2+\ldots+\alpha^9.$$

The coefficients (after division by $\Delta_{10}$) of 25° C. and 230° C. are transmission influences after a certain number of dunkings of heat sink and heat source from each end. The generalization to an arbitrary number of baths is therefore easy.

As a concrete numerical example, assume that the ratio $\alpha=1$, then $\Delta_1=2$, $\Delta_2=3$, $\Delta_3=4$, $\Delta_4=5$, $\Delta_5=6$, $\Delta_6=7$, $\Delta_7=8$, $\Delta_8=9$, $\Delta_9=10$, $\Delta_{10}=11$. The temperatures are then a linearly increasing sequence of increment $$\Delta T = (230° C. - 25° C.)/11 = 18.64° C.$$

$T_1=43.6\ C, T_2=62.3\ C, T_3=80.9\ C, T_4=99.5\ C, T_5=118.2\ C, T_6=136.8\ C, T_7=155.5\ C, T_8=174.1\ C, T_9=192.7\ C, T_{10}=211.4\ C.$

Because hexane has a boiling point of 69° C., pools 2 and 1 (i.e., the solvent pools 106 and 108) can be made hexane baths. Beyond pool 1, the paths of biocoal and biomass diverge. The biomass comes from the ambient air and dives into the water reservoirs A1 and A2 of water at 25° C. to enter the sealed chambers of the torrefaction unit. It is not necessary for the biocoal to enter the same reservoirs, since it is exiting the unit and its fate can have no effect on the system as long as the entering biomass is at 25° C. Therefore, the exiting biocoal can be pulled through a separately sealed and heated water bath B2 at 80° C., or some other temperature higher than the 69° C. needed to vaporize hexane at atmospheric pressure. Hexane and oil are not miscible in water; and the hexane in the biocoal becomes a piped gas that can be later recondensed. The oil still remaining in the biocoal is diluted by the two hexane pools 106 and 108 and can be made to be a minor part (such as 1%) of the total weight transported to a coal-fired power plant. A final water reservoir B1 at 25° C. can cool the biocoal and any remaining hexane in it to a safe ambient condition. The water in the biocoal from this final bath can be evaporated by natural means during transportation or be actively removed by burning the uncondensed VOCs. End users may also accept high-moisture content biocoal with an appropriate discount for the weight of water.

Depending on the number and inner and outer diameters of the pipes carrying the VOC vapor and steam, the latter driven only by the mechanical condition of maintaining one atmosphere of pressure may or may not reach the equilibrium temperature of the baths surrounding them. In the absence of phase changes, the highly subsonic mean flow is governed by the bulk cooling equation, $$\frac{d}{dx}(\dot{m}c_P T) = -Nu\left[\frac{K(T - T_b)}{D_e}\right]\pi D_e,$$

where $\dot{m}$ is the mass-rate of vapor transport in a single pipe, $D_e$ is the inner diameter of the pipes, Nu is the Nusselt number of the turbulent flow in the pipe,
K is thermal conductivity of the vapor, and $T_b$ (x) is the average boundary temperature of the inner surface of the pipe (not necessarily the same as the mean temperature of the pool $T_p$).

The temperature $T_b$ (x) is given by the condition that the heat given up by the gas has to be conducted across a metal wall of thickness h:

$$K_{metal}\frac{(T_b - T_p)}{h}\pi D_e = -\dot{m}c_P\frac{dT}{dx}.$$

The substitution of $T_b$ from the previous equation into the one before it yields the ordinary differential equation:

$$\frac{\dot{m}c_P}{\pi D_e}\left[\frac{D_e}{NuK} + \left(\frac{h}{K_{metal}}\right)\right]\frac{dT}{dx} = -(T - T_p),$$

in which the terms in the square bracket give the formula for the resistance to heat flow when convection and conduction add in series.

If Nu is taken to equal its mean value in this part of the flow, the ordinary differential equation above can be integrated to yield $$T(x) - T_p = (T_0 - T_p)e^{-x/x_0},$$

where $T_0$ is the value of T at x=0 and $x_0$ is the characteristic length, $$x_0 \equiv \frac{\dot{m}c_P}{\pi D_e}\left[\frac{D_e}{NuK} + \left(\frac{h}{K_{metal}}\right)\right].$$

The mass-release rate $\dot{M}_v$ of VOCs plus steam is typically 40 to 60% the rate of processing biomass $\dot{M}_b$. In an oil system that processes, for example, 80 metric tons of biomass in 10 minutes, $\dot{M}_v$ might equal 57.11 kg s$^{-1}$. Carried in 256 circular pipes, each of inner diameter $D_e$=0.1 m, the vapor has a mass-transport rate per pipe of $\dot{m}=\dot{M}_v/256$=0.2331 kg s$^{-1}$. If the coefficient of viscosity of the gas is $\mu$=0.000025 kg m$^{-1}$ s$^{-1}$, the mean Reynolds number of the pipe flow is Re=(0.2231 kg s$^{-1}$)(0.1 m)/[$\pi$(0.05 m)$^2$(0.000025 kg m$^{-1}$ s$^{-1}$)]=113,600.

The friction factor associated with this Reynolds number is f=0.004379.

If a thermal conductivity K=0.04 W W m$^{-1}$ K$^{-1}$ and a specific heat capacity $c_P$=1,000 J kg$^{-1}$ K$^{-1}$ are assumed, a Prandtl number Pr=$\mu c_P$/K=0.625 is associated with the VOC vapor and steam. The Nusselt number associated with the turbulent flow, Re=113,600 and Pr=0.625, is then Nu=183. With a metal thickness h=0.01 m and thermal conductivity $K_{metal}$=20 Wm$^{-1}$ K$^{-1}$, the characteristic length $x_0$=10.04 m. If VOC vapor starts from the hot oil river at $T_0$=293° C. and enters a warm oil river with $T_p$=230° C., the temperature of the VOC gas after traversing 80 m is 230.0° C. The subsequent flow temperature is listed in Table 1.

TABLE 1

VOC temperature for heat transfer from pipes of 0.1 m inner diameter.

| Pool | Length (m) | $T_p$ (° C.) | VOC T (° C.) |
|---|---|---|---|
| Oil (warm river) | 80 | 230.0 | 230.0 |
| Oil (pool 10) | 10 | 211.4 | 218.3 |
| Oil (pool 9) | 10 | 192.7 | 202.1 |
| Oil (pool 8) | 10 | 174.1 | 184.4 |
| Oil (pool 7) | 10 | 155.5 | 166.2 |
| Oil (pool 6) | 10 | 136.8 | 147.6 |
| Oil (pool 5) | 10 | 118.2 | 129.1 |
| Oil (pool 4) | 10 | 99.5 | 110.4 |
| Oil (pool 3) | 20 | 80.9 | 84.9 |
| Hexane (pool 2) | 40 | 62.3 | 62.7 |
| Hexane (pool 1) | 40 | 43.6 | 44.0 |
| Water (reservoir A1) | 20 | 25.0 | 27.6 |
| Water (reservoir A2) | 20 | 25.0 | 25.4 |
| Water (reservoir B1) | 20 | 80.0 | — |
| Water (reservoir B2) | 20 | 25.0 | — |

Of the major VOC condensates, according to the above Table, the drainage of furfural into a tap-out drain will occur in oil pool 6; hydroxyacetone, in oil pool 5; lactic and acetic acid, in oil pool 4; formic acid and water, in oil pool 3, methanol and hexane (from distillation of the solvents) in the hexane pool 2 (made 40 m long in the example provided to provide a better wash of oil from the exiting biocoal). The first hexane pool 106 (i.e., pool 1) provides further dilution of the oil that exits with the biocoal. Although the temperatures of the VOC vapor in their pipes are not equal to those of the surrounding liquids, they are never more than 11° C. different for the illustrated configuration of pipes, so the estimation technique used to compute the temperatures of the surrounding liquids is approximately valid (if $\alpha$=1). Inclusion of the effects of latent heats will change the detailed numbers but not the overall pattern. Similar considerations apply to the vapors released in any of the enclosed spaces of the torrefaction unit if pipes open to the vapors carry them out through the system of preparation pools and reservoirs.

Third Embodiment

Figure 6:
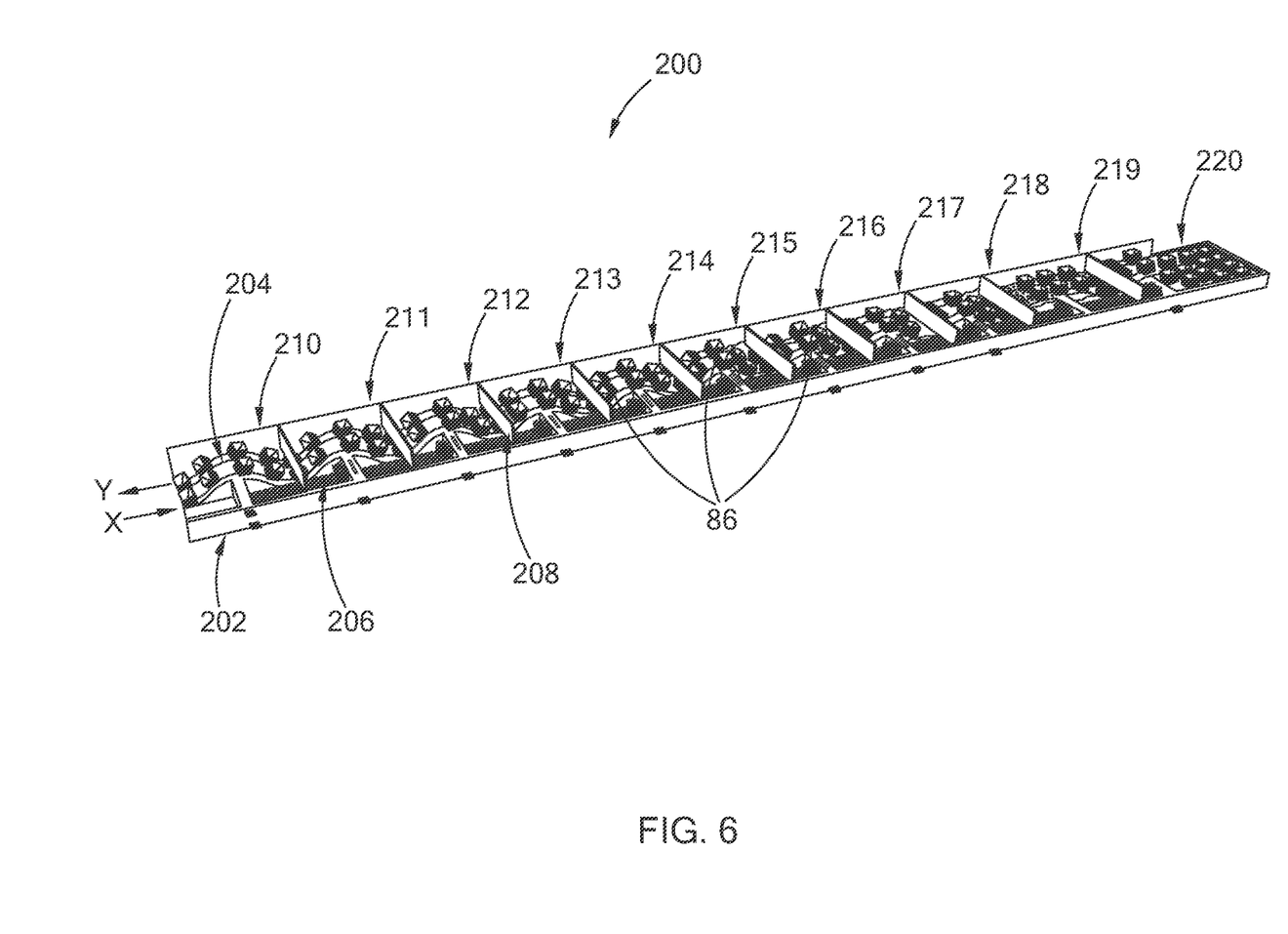
FIG. 6 is a schematic view of a torrefaction unit, again with the ceiling removed, according to a third embodiment of the present disclosure that specializes to use molten salt as the heat transfer agent, and a series of water pools ranging from cool to boiling hot to wash off the molten salt.

Referring to FIG. 6, the torrefaction unit 200 according to a third embodiment of the present disclosure is similar to that of the second embodiment, differing in the number of bodies of liquid and the type of liquid transfer agents. More specifically, the torrefaction unit 200 includes a housing 202, a conveyor system 204, a gas collecting system 206, and an air lock system 208. The plurality of bodies of liquid include nine water pools, 210, 211, 212, 213, 214, 215, 216, 217, and 218, one boiling water river 219, and one torrefying molten-salt river 220. The torrefying river 220 contains an appropriate molten salt, such as a eutectic mixture of sodium acetate and potassium acetate, as the heat transfer agent. Molten salts are extremely soluble in liquid water and thus no other solvent is needed in the present embodiment.

A eutectic mixture of sodium acetate and potassium acetate has an optimum operating temperature of approximately 300° C., which is between the melting temperature of about 230° C. and the decomposition temperature of around 460° C. Using a eutectic mixture of alkali-acetate salts has the advantage of increased heat capacity, roughly 2,000 times per unit volume over flue gas under the same operating temperature. Therefore, the torrefaction process using molten salt is much faster than a conventional torrefaction process using flue gas as a heat transfer agent. As such, the torrefaction process of the present embodiment can significantly improve throughput with reduced production costs, thereby replacing natural coal with biocoal as a feasible alternative.

The molten salt in the torrefying river 220 is maintained at 300° C., but the warm river 219 of boiling water, being at near-atmospheric pressure, is maintained only at 100° C., thermostated by the transformation of water to vapor form when the exiting hot biocoal from the molten salt river 220 plunges into the boiling water river 219, and by the condensation of vapor into liquid form when entering cool biomass plunges into boiling water river 219. If the ambient temperature at which biomass enters the torrefaction unit 200 is 25° C., then the nine water pools 210 through 218 preceding the boiling water river 219 are at 32.5° C., 40.0° C., 47.5° C., 55.0° C., 62.5° C., 70° C., 77.5° C., 85° C., and 92.5° C., respectively.

In the molten-salt embodiment, the water pools 210 through 218 serve another purpose besides air exclusion (and energy conservation) in the gradual stepping up/down in the temperature of the biomass/biocoal (for safety) as they enter/exit the apparatus. The water pools 210 through 218 also wash clean the biocoal of salt. To perform these functions, while recovering all the salt except for an acceptably small residue that leaves with the exiting biocoal, pools 210 through 218 are stagnant and acquire a salt concentration that reaches passive equilibrium between more salty biocoal and less salty biomass that traverse the pool in opposite directions. In equilibrium, the water pools 210 through 218 represent an increasing sequence in salinity. Thus, in passing from the water pool 218 through pool 210, biocoal becomes less and less salty; while in passing from the water pool 210 through pool 218, biomass becomes more and more salty. An acceptable level of residual salt (say, 0.1% of the weight of the biocoal) that leaves with the biocoal can be achieved by adding sufficient distilled water to the boiling water river 219 so that its salinity is kept at about 50% (i.e., acetate salt is about 50% by weight of the solution). To achieve this result, between (wash) pools 218-215 and (rinse) pools 214-210, we may have to open the lids to baskets and press the exiting biocoal to reduce their pore volume fraction from an estimated value of about 0.67 when it leaves the salt river to about 0.28 before they enter the rinse pools 214 through 210. The specific numbers given in the present disclosure are illustrative only, and do not limit our claims of originality for applications with other possible parameters for biomass input, equipment properties, or operating procedures.

The pools are modular, with the length of a given module adjusted according to the desired capacity of the production plant. The size of the torrefying river 220 is adjusted to torrefy a desired amount of biomass in each basket every ten minutes. While fourteen baskets are shown fully immersed in the molten salt river 220, any number can be accommodated in a large enough river by varying the speed at which each basket is drawn through the river so that the torrefaction unit 200 can be expanded or downsized depending on applications. The amount of heat that needs to be added to keep the flowing salt in the river at a temperature of 300° C. must be increased accordingly if the throughput of biomass increases.

Similar to the first embodiment, the conveyor system 204 moves a plurality of caged baskets 86 that carry the chopped biomass/biocoal along the conveyor system 204 to submerge and raise the biomass/biocoal in and out of the water pools 210 through 218, the boiling water river 219, and the molten-salt river 220. Two rows of baskets 86 move in opposite directions in each pool except the torrefying river 220 where the baskets 86 are arranged into four rows in the example shown to allow for more biomass to be torrefied at the same time. The biomass 22 is charred in hot eutectic sodium acetate/potassium acetate salt in the torrefying river 220. The air lock system 208 includes a plurality of dividers 90 provided in the pools 210 through 218 to block entry of air (particularly oxygen) into the space above the pools and the rivers 219 and 220.

Figure 7:
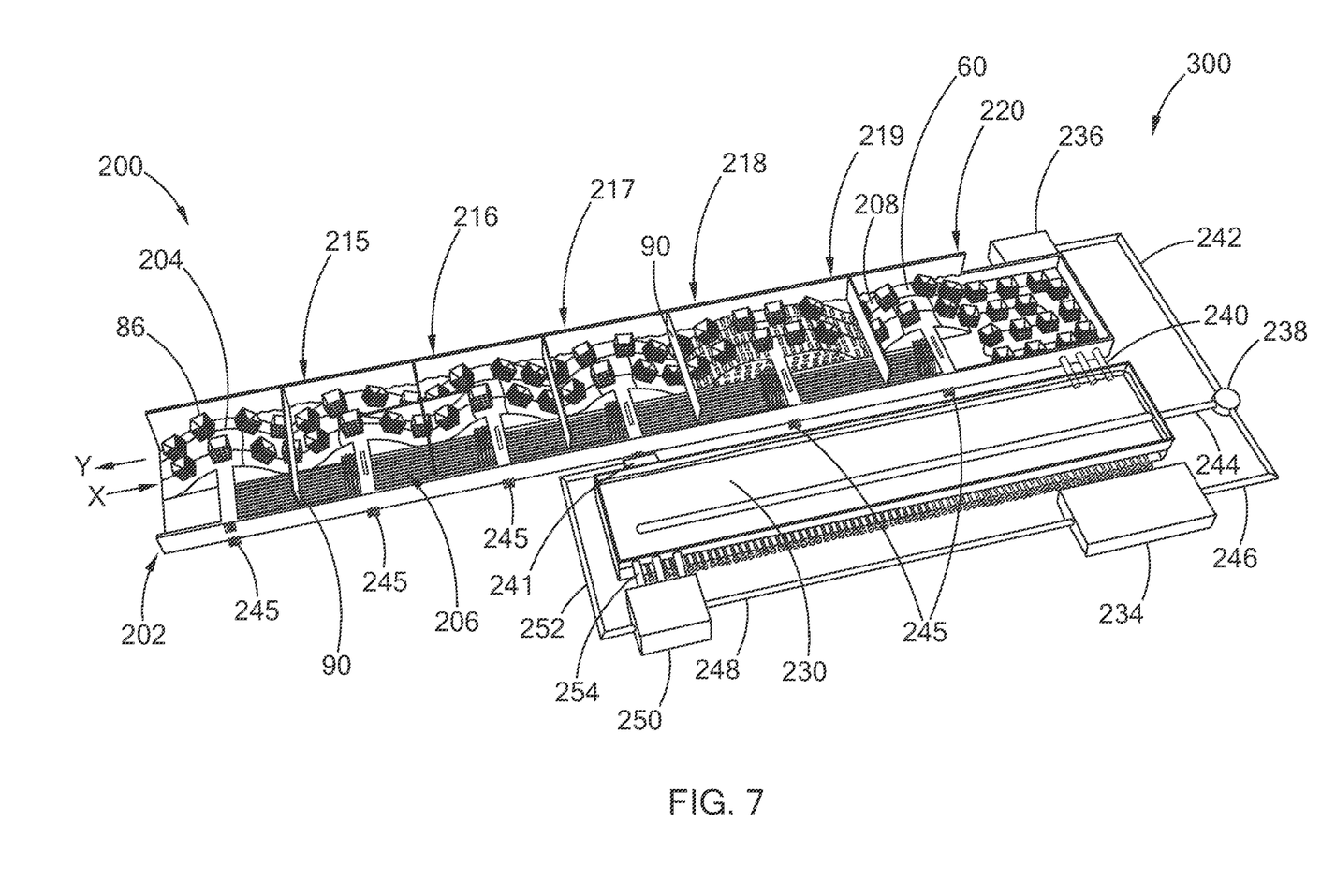
FIG. 7 is a schematic view of a complete plant including a torrefaction unit of the third embodiment of the present disclosure, wherein molten alkali-acetate salts are used as both the heat-transfer agent and as a means to catalyze the production of concentrated liquid acetone from dilute acetic acid.

Referring to FIG. 7, a complete production plant 300 including the torrefaction unit 200 of FIG. 6 together with other apparatuses is shown, wherein molten alkali-acetate salts are used as both the heat-transfer agent and as a means to catalyze the production of concentrated liquid acetone from dilute acetic acid. Acetate salts are relatively mild corrosive agents and can act as electrolytes when molten. Precaution should be shown in the choice of metal alloys, for example, stainless steels, when constructing the components, and the use of different metals for different components should be avoided to minimize possible Galvanic corrosion.

In FIG. 7, only a limited number of pools of the torrefaction unit 200 are shown. The production plant 300 further includes a pre-heating unit 230, a post-heating unit 234, a charcoal filter 236, a salt pump 238, and a chemical reactor vat 250. To prevent the salt from freezing in the pipes when the production plant is shut down for maintenance, the pre-heating unit 234 should be seated lower than the other components of the system so that the molten salt drains toward the pre-heater when the pumps are shut off. Pumps (not drawn) are employed to pump the salt "uphill" from the pre-heater to the salt river 220. The torrefying river 220 flows from the outlet pipes 240 of these pumps toward a downstream charcoal filter 236 for removing small fragments of biocoal from the torrefying river 220. Farther downstream from the charcoal filter, a salt pump 238 drives most of the salt into the pre-heater 230 but also shunts off a portion of the salt to the post-heater 234. The post-heating unit 234 produces gaseous acetone and liquid alkali-carbonate salt. The chemical reactor vat 250 produces an aqueous solution of alkali-acetate salt.

More specifically, the pre-heating unit 230 accepts acetate salt cooled by contact with biomass in the torrefaction unit 200 and heats it back up to 300° C. The acetate salt is then pumped through pipes 240 into the torrefying river 220. While the pre-heating unit 230 is shown to be a long pan, it can have any configuration. With adequate insulation, most of the 20% heat loss experienced by conventional pan-style gas heaters may be avoided. Collection boxes 241 (only one is shown adjacent to water pools 217 and 218) may be provided adjacent to the pools 215, 216, 217, 218, 219, 220 to collect

VOCs delivered by condensation pipes 245. The low vapor pressure of the molten salt may lead to a slow build-up of salt within the condensation pipes. Periodic maintenance should include occasional flushing of these pipes with hot water.

The calibrated amount of salt diverted from the salt pump 238 by the pipe 246 to the post-heating unit 234 produces gaseous acetone and liquid alkali-carbonate salt by heating the alkali-acetate salt above its thermal decomposition temperature of 460° C., preferably 500° C. The molten alkali-carbonate salt then flows via a pipe 248 to the chemical reactor vat 250. Diluted acetic acid from one of the collection boxes 241 is also delivered to the chemical reactor vat 250 where alkali-carbonate reacts with diluted acetic acid to form gaseous carbon dioxide and an aqueous solution of alkali-acetate salt. Carbon dioxide is vented out. The aqueous solution of alkali-acetate salt, which is below 100° C., is directed to the pre-heating unit 230 via pipes 254. Water vapor is also released from the chemical reaction due to intense heat and can be distilled and condensed for sale or other purposes. The amount of acetate salt decomposed to carbonate salt is calibrated so as to use up the corresponding flow of acetic acid to remake the acetate salt.

The biocoal produced by the present embodiment has properties superior to bituminous natural coal available on the market. For this reason we refer to our process using molten salts as the heat-transfer agent as "supertorrefaction". For example, in one sample run, the biocoal had a Hargrove Grindability Index (HGI) of 67, readily acceptable by coal-fired power plants. The heating value of the biocoal was 6,139 kcal/kg=25.7 MJ/kg, comparable to the best bituminous coal available on the market. The residual VOC at 36.11% and the carbonaceous content of 49.55% had a ratio that depends on the degree of torrefaction. Breakdown of plant tissue by salt desiccation helps to speed up the process. Generally speaking, compared to torrefaction with flue gas, supertorrefaction of the present disclosure produces a lower ratio of residual VOC/Carbon, which leads to a higher quality product.

In addition, the sulfur content in the biocoal is only 0.06%, better by an order of magnitude than that in natural coal. The ash content of the biocoal is approximately 5.69%, as opposed to 20%-40% ash in many steam coals. When the biomass is bamboo, the ash is rich in potash and can be sold and used as fertilizer, as opposed to being a "waste stream" in conventional coal burning. The remainder of the mass of the biocoal is the moisture content, which depends on the drying procedure and the storage conditions before use. Thus, no waste stream is generated by the torrefaction process of the present disclosure.

The condensation stages separate water and acetic acid (the bulk of the organic acid recovered from the VOCs) from the other bioliquids. Dilute acetic acid in this form has minor economic value as a preservative to prevent hay bales from rotting, or as a disinfectant in the meat packing industry. Using alkali-acetate salts has a considerable advantage in allowing us to convert the dilute acetic acid into concentrated acetone, which has major economic value as an industrial solvent, or potentially as a component of aviation fuel. We begin by heating in the post-heating unit 234, for example, potassium acetate as one component of our molten salt above its decomposition temperature of about 460° C. to obtain potassium carbonate and acetone:

The acetone leaves the mixture as a vapor and can be condensed out as a pure liquid by passing the gas at atmospheric pressure through pipes in the water pools until its temperature drops below 56° C. Although we used the example of potassium acetate, the same result could also be achieved with sodium acetate, lithium acetate, or other alkali acetate salts.

Dissolved in an aqueous solution, the potassium carbonate is a weak base. To recover the actetate form of the salt, we react the potassium carbonate in the chemical reactor vat 250 with the dilute acetic acid produced from the condensation of VOCs in the torrefaction of biomass:

The reaction is mildly exothermic, but with normal heat losses, the reaction involving dilute aqueous solutions can be carried out at room temperature, with only the $CO_2$ escaping as a gas. To recover the potassium acetate in the form of an anhydrous molten salt, we can drive out the liquid water in the heater with which we use to pre-heat the molten eutectic acetate salt to 300° C. for the salt river 220. The water vapor so produced, which is not mixed with the VOCs of the torrefaction process, is a condensation product that may be pure enough to be potable—after all, in addition to being distilled, it has been pre-filtered by osmotic processes through the membranes of living bamboo. The excess potable water may have some commercial value for human and/or animal consumption, or for agricultural use. A portion of it may be used to lower the salinity of the boiling water pool 219 as described previously.

Torrefaction by organometallic salts, such as a eutectic mixture of sodium acetate and potassium acetate, as compared to torrefaction by mineral oil, has the following advantages: (1) added safety because the acetate salts, even when contaminated with biocoal fragments will not burn as readily as oil or paraffin should air leak into the torrefaction apparatus; (2) greater stability to thermal degradation as long as the salt is held above its (eutectic) melting temperature of about 230° C. and below its decomposition temperature of about 460° C.; (3) greater ease of recovery of the salt held by the biocoal within its pores and sticking to its surface because organic alkali salts are very soluble in water, especially if the water is warm or boiling hot; (4) a natural and simple two-step process to upgrade a relatively abundant product of VOC condensation from biomass torrefaction, dilute acetic acid, to a concentrated and more economically valuable commodity, liquid acetone; (5) a possibility of extending the torrefaction mechanism to yet higher temperatures and shorter timescale into the pyrolysis regime where the efficient production of bio-oils and syngas, along with biocoal, becomes a viable high-throughput process.

The torrefaction units 20, 100 and 200 of the present disclosure significantly reduce energy consumption, while improving throughput. According to the present disclosure, the temperature of the various pools except for the torrefying pools are passively controlled by the entering cool biomass, exiting hot biocoal, and VOCs without using external heating or cooling sources, as opposed to prior art torrefaction system which uses external energy sources to preheat the biomass and cool the biocoal.

Moreover, the torrefaction units 20, 100 and 200 of the present disclosure improve the quality of biocoal and reduces production costs by removing and recovering the heat transfer agents from the biocoal. In one embodiment, molten organic salt is used as the heat transfer agent and can be easily dissolved in water and recovered. In another embodiment, when oil/paraffin is used as the heat transfer agent, a plurality of solvent and water pools are used to wash off the oil and solvent remaining in the biocoal and thus the oil and solvent can be recovered and reused. The torrefaction units 20, 100 and 200 of the present disclosure produce a cleaner and higher quality biocoal with minimal residual chemical agents, while ensuring a safe production process should air somehow leak into the torrefaction system or unit.

Very importantly, in the torrefaction units 20, 100 and 200 of the present disclosure, the biomass and the biocoal are arranged to travel through the same pools in opposite directions along a continuous path with more rows of biomass in the primary torrefying pool. Within limits, the throughout can then be increased by adjusting the travel speed of the biomass/biocoal without changing the number of heating/cooling pools, yielding more compact configurations.

The broad teachings of the disclosure can be implemented in a variety of forms, including batch-processing configurations rather the continuous-processing example described in this application. Therefore, while this disclosure includes particular examples, the true scope of the disclosure should not be so limited since modifications will become apparent from the following claims.

What is claimed is:

1. A supertorrefaction system comprising:
   a plurality of pools including at least one supertorrefying pool containing molten salt as a liquid heat transfer agent that is in direct contact with the biomass and that converts the biomass into biocoal, and at least one wash pool containing salty wash water that is in direct contact with the biocoal and that cools the biocoal, dissolves and removes the salt attached to the biocoal; and
   a conveyor system transporting the biomass through the plurality of pools in a first direction while transporting the biocoal in a second direction opposite to the first direction.

2. The supertorrefaction system according to claim 1, wherein the conveyor system transports the biomass and the biocoal in a continuous path.

3. The supertorrefaction system according to claim 1, wherein the plurality of pools have different temperatures to heat the biomass in a stepwise fashion.

4. The supertorrefaction system according to claim 1, further comprising a housing and a plurality of bridges raised from a bottom of the housing, the plurality of pools being divided by the bridges.

5. The supertorrefaction system according to claim 1, wherein the plurality of pools includes a first supertorrefying pool having a first temperature and a second supertorrefying pool having a second temperature higher than the first temperature.

6. The supertorrefaction system according to claim 1, wherein the plurality of pools include a plurality of wash pools containing salty wash water, the plurality of wash pools consecutively dissolve and remove the salt attached to the biocoal such that the plurality of wash pools have a gradually decreasing salinity in the direction where the biocoal travels.

7. The supertorrefaction system according to claim 1, wherein the plurality of pools further includes at least one end pool containing fresh water.

8. The supertorrefaction system according to claim 7, wherein the biomass is transported from the at least one end pool containing fresh water, through the at least one wash pool and is torrefied in the at least one supertorrefying pool.

9. The supertorrefaction system according to claim 8, wherein the biocoal is transported from the supertorrefying pool, through the at least one wash pool and to the at least one end pool containing fresh water.

10. The supertorrefaction system according to claim 9, wherein a temperature of the at least one wash pool or the at least one end pool is controlled based on a temperature of the biomass and the biocoal travelling through in opposite directions.

11. The supertorrefaction system according to claim 1, further comprising a gas collecting system for collecting, condensing and separating volatile organic compounds driven out from the biomass.

12. The supertorrefaction system according to claim 1, further comprising a post-heating unit that heats alkali-acetate salt filtered from the at least one wash pool to generate gaseous acetone.

13. The supertorrefaction system according to claim 12, further comprising a chemical reactor vat in fluid communication with the post-heating unit for generating an aqueous solution of alkali-acetate salt.

14. The supertorrefaction system according to claim 12, further comprising a pre-heating unit for reheating the salt that is taken from the at least one wash pool and that is cooled by contact with the biomass and for accepting an aqueous solution of alkali-acetate salt from the chemical reactor vat to distill the solution of its water content.

15. A supertorrefaction system comprising:
   a supertorrefying pool containing a liquid heat transfer agent including molten salt to be in direct contact with biomass fragments to heat the biomass fragments into biocoal,
   a plurality of wash pools containing saline or fresh water that consecutively dissolve and remove salt attached to the biocoal to clean the biocoal and simultaneously cool the biocoal; and
   a conveyor system transporting the biomass through the supertorrefying pool and the plurality of wash pools in one direction and transporting the biocoal through the supertorrefying pool and the plurality of wash pools in a reverse direction,
   wherein the plurality of wash pools have different temperatures and are arranged such that the biomass is gradually heated when being transported through the plurality of wash pools in the one direction and the biocoal is concurrently and gradually cooled when being transported through the plurality of wash pools in the reverse direction.

16. The supertorrefaction system according to claim 15, wherein the plurality of wash pools are arranged to consecutively wash debris from the entering biomass, to impregnate the biomass with salt to help with subsequent dehydration, and dissolve and remove the salt attached to the biocoal to clean the biocoal such that the plurality of wash pools have a gradually decreased salinity in the reverse direction after the biocoal is transported through the plurality of wash pools.

17. The supertorrefaction system according to claim 1, further comprising a plurality of porous baskets for carrying the biomass and the biocoal, the plurality of baskets being transported by the conveyor, at least two rows of the baskets are transported in each of the plurality of wash pools, one row of the baskets carrying the biomass, and the other row of the baskets carrying the biocoal.

* * * * *